(12) United States Patent
Honda et al.

(10) Patent No.: US 7,999,038 B2
(45) Date of Patent: Aug. 16, 2011

(54) WEATHERSTRIP

(75) Inventors: Masayuki Honda, Saitama (JP); Hajime Tsujihana, Saitama (JP); Minoru Yoshida, Saitama (JP); Nobuyasu Noda, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 529 days.

(21) Appl. No.: 11/699,524

(22) Filed: Jan. 29, 2007

(65) Prior Publication Data

US 2007/0122570 A1 May 31, 2007

Related U.S. Application Data

(63) Continuation-in-part of application No. 11/399,693, filed on Apr. 6, 2006.

(30) Foreign Application Priority Data

Sep. 30, 2005 (JP) ................. 2005-287691

(51) Int. Cl.
*C08F 8/00* (2006.01)
*C08L 9/00* (2006.01)
*C08L 23/04* (2006.01)
*C08L 25/02* (2006.01)

(52) U.S. Cl. ......... 525/191; 525/232; 525/240; 525/241

(58) Field of Classification Search .................. 525/191, 525/232, 240, 241; 524/500, 515
See application file for complete search history.

(56) References Cited

U.S. PATENT DOCUMENTS

2003/0036598 A1* 2/2003 Yamasa et al. ................ 524/495
2008/0182939 A1   7/2008 Morikawa et al.

FOREIGN PATENT DOCUMENTS

| | | |
|---|---|---|
| JP | 11-342750 A | 12/1999 |
| JP | 2000-52780 | 2/2000 |
| JP | 2000-327848 A | 11/2000 |
| JP | 2002-020558 A | 1/2002 |
| JP | 2003-200738 | 7/2003 |
| JP | 2004-299640 A | 10/2004 |
| JP | 2004-299668 A | 10/2004 |
| JP | 2004-306937 A | 11/2004 |
| JP | 2006-257313 A | 9/2006 |
| WO | 03/025055 A1 | 3/2003 |

OTHER PUBLICATIONS

International Search Report for PCT/JP2007/064050 mailed on Nov. 20, 2007, 3 pages.
International Preliminary Report on Patentability for PCT/JP2007/064050 mailed on Jan. 29, 2009, 8 pages.
Patent Abstracts of Japan, Publication No. 2002-020558, Publication Date: Jan. 23, 2002, 1 page.
Patent Abstracts of Japan, Publication No. 2006-257313, Publication Date: Sep. 28, 2006, 1 page.
Patent Abstracts of Japan, Publication No. 2004-299640, Publication Date: Oct. 28, 2004, 1 page.
Patent Abstracts of Japan, Publication No. 2004-299668, Publication Date: Oct. 28, 2004, 1 page.
Patent Abstracts of Japan, Publication No. 2004-306937, Publication Date: Nov. 4, 2004, 1 page.
Patent Abstracts of Japan, Publication No. 2000-327848, Publication Date: Nov. 28, 2000, 1 page.
Patent Abstracts of Japan, Publication No. 11-342750, Publication Date: Dec. 14, 1999, 1 page.
Patent Abstracts of Japan, Publication No. 2003-213141, Publication Date: Jul. 30, 2003, 1 page.
Office Action for U.S. Appl. No.: 12/465,445, Dated Apr. 5, 2011 (17 Pages).

* cited by examiner

*Primary Examiner* — Nathan M Nutter
(74) *Attorney, Agent, or Firm* — Osha • Liang LLP

(57) ABSTRACT

A weatherstrip composition includes the following polymer A group and polymer B group, Polymer A group. A polymer group is made up of a domain 1 consisting of crosslinked product of a polymer selected from a group consisting of ethylene polymer, ethylene/α-olefin copolymer (where the α-olefin has from 3 to 20 carbons), ethylene/α-olefin/diene copolymer (where the .alpha.-olefin has from 3 to 20 carbons), homopolymer rubber of a conjugated diene monomer, copolymer polymerized with a conjugated diene monomer and an aromatic vinyl monomer, and hydrogenated copolymer polymerized with a conjugated diene monomer and an aromatic vinyl monomer (where the hydrogenation of all double bonds except for the aromatic groups is at least 50%), and a domain 2 is made up of crosslinked product of ethylene polymer or ethylene/α-olefin copolymer (where the α-olefin has from 3 to 20 carbons).

12 Claims, 7 Drawing Sheets

(a) (b)

WEATHERSTRIP

CROSS-REFERENCE TO RELATED APPLICATIONS

This is a Continuation-In-Part application of Ser. No. 11/399,693 filed on Apr. 6, 2006 now pending.

BACKGROUND OF THE INVENTION

1. Field of the Invention

The present invention relates to a weatherstrip that is used as an automotive part.

2. Related Background of the Invention

The weatherstrip attached to the window frames of automobile doors is an automotive part that seals the outer periphery of the window glass. The weatherstrip thereby holds the window glass securely in place, prevents rain, wind, dust, and so forth from getting into the passenger compartment, and allows the window glass to be opened and closed more smoothly. The weatherstrip is usually made of an elastomeric material so that it can function as intended. More specifically, it is made of ethylene-propylene-diene rubber (EPDM), polyolefin thermoplastic elastomer (TPO), or the like.

An example of prior art related to weatherstrips is a product of using a urethane- or silicone-based surface treatment agent to coat surfaces that come into contact with window glass, and curing the agent to obtain coating layer. Another example is a weatherstrip molded from a specific thermoplastic elastomer or resin.

For example, Japanese Patent Publication H7-73893 discloses a weatherstrip in which portions that come into contact with window glass are provided with a thin protective film which is composed of a synthetic resin whose base material is a polyolefin resin. The resin is mixed with a polyolefin resin powder or particles of various size with higher viscosity and lower fluidity than this base material. Roughened components are irregularity formed on a surface layer of the thin protective film.

Japanese Patent Application Laid-Open 2000-52780 discloses a weatherstrip in which a mold-formed part connected to an extrusion molded part is molded from a thermoplastic elastomer or soft resin to which antifriction solid particulates have been added. The ten points average roughness (Rz) of the surface of the mold-formed portion is from 1 to 50 μm.

Japanese Patent Application Laid-Open 2003-200738 discloses a weatherstrip in which a sliding part is covered with or contains a specific material so as to adjust the elastic modulus of the sliding part. In Japanese Patent Application Laid-Open 2003-200738, it is stated that dust that adheres to a sliding part contributes to the generation of noise. It is also stated that the use of materials with a low elastic modulus (soft materials) and materials with low surface energy (non-hydrophilic materials, non-moisture absorbent materials, low surface tension materials, high contact angle materials, and low SP value materials) is undesirable because dust tends to adhere to or be held by these materials, and the surface roughness of sliding parts is related to dust adhesion and retention. Also, Japanese Patent Application Laid-Open 2003-200738 states that since window glass can be scratched and sliding noise increases during the raising and lowering of window glass, it is undesirable to use a material with a high elastic modulus, Application Laid-Open 2003-200738 teaches the use of hydrophilic and moisture absorbent materials, and favorable ranges for the elastic modulus, surface tension, contact angle, SP value, and surface roughness (Rz) thereof.

Japanese Patent Publication S61-4408 discloses a weatherstrip in which the friction coefficient is lowered and wear resistance is improved. Such a weatherstrip is produced by coating with or immersion in a surface treatment agent containing silicone oil, followed by drying to form a cover layer.

SUMMARY OF THE INVENTION

However, when a conventional weatherstrip repeatedly comes into frictional contact with window glass, the sliding resistance increases greatly and there is a need for improvement in terms of the opening and closing of the window glass. Nor is conventional weatherstripping satisfactory in terms of preventing a squeaking noise and a rubbing sound, and of suppressing a permanent set and whitening by bend when the weatherstrip is attached to a window frame.

It is an object of the present invention to provide a weatherstrip that has excellent slidability and wear resistance, and that is capable of efficiently suppressing the generation of a squeaking noise or a rubbing sound, and a permanent set and whitening when the weatherstrip is attached to a window frame.

As a result of diligent research aimed at solving the above problems, the inventors arrived at the present invention upon discovering that these problems can be solved by covering the sliding part of a lip that comes into contact with window glass with a sliding member composed of a specific material having a storage elastic modulus E' and a loss tangent tan δ within specific ranges. How the present invention was arrived at will now be discussed in detail.

To solve the above problems, the inventors measured the elastic modulus of a best-mode sliding member they developed themselves, under the conditions discussed in Japanese Patent Application Laid-Open 2003-200738, by nano-indentation, using a super-light load thin-film hardness tester made by Hysitron. As a result, they confirmed that the range of the elastic modulus given in Japanese Patent Application Laid-Open 2003-200738 is not necessarily appropriate for solving the above problems.

Also, it was discovered that the elastic modulus is not a parameter that indicates how likely it is that dust will adhere as discussed in Japanese Patent Application Laid-Open 2003-200738. Instead, it is discovered that the elastic modulus indicates how likely it is that deformation will occur at microscopic portions of a sliding member when the window glass slides. That is, the greater the elastic modulus, the less deformation there is, which should be interpreted to mean that there is less increase in sliding resistance due to deformation energy loss.

Furthermore, it was newly discovered that, particularly when high pressure is generated in the microscopic portions of a weatherstrip, the increase in sliding resistance due to deformation energy loss will depend not on the elastic modulus alone. For example, when high contact pressure is generated because the installation location of window glass is asymmetric to the weatherstrip, and when mud, sand, or the like becomes trapped between the window glass and the weatherstrip, the mud, sand, or the like becomes embedded in the weatherstrip when the window glass rubs against the weatherstrip, or when the window glass slides over these embedded portions, the weatherstrip is damaged or undergoes permanent set. In this case, the increase in sliding resistance due to deformation energy loss will depend not only on the elastic modulus, but also on whether there is deformation recovery in the microscopic portions of the sliding member, and that the deformation recovery of the microscopic portions is expressed by the loss tangent tan δ.

Also, the inventors came to the conclusion that the technology of preparing the irregularity on the surface of the weatherstrip discussed in Japanese Patent Publication H7-73893 and Japanese Patent Application Laid-Open 2000-52780 is aimed at lowering sliding resistance by reducing the contact area with window glass, and does not take into account the deformation of or damage to the sliding parts of a weatherstrip. Furthermore, in such a technology, repeated frictional contact wears down the irregularity on the surface and increases sliding resistance. The inventors also came to the conclusion that the elastic modulus discussed in Japanese Patent Application Laid-Open 2003-200738 is probably reduced modulus (when drawing out), and may not express all of the deformation, so the dynamic elastic modulus (return upon pushing) likely has a higher correlation to repeated frictional contact properties. Because of this, it seems that the storage elastic modulus and the loss tangent tan $\delta$ are important for solving the above problems.

The inventors also discovered that even with a mirror-finished sliding member having substantially no surface irregularity, which is obtained by injection molding, press molding, or the like, it is possible to form a sliding member with which there is no increase in sliding resistance due to repeated frictional contact with window glass, as well as a sliding member having surface irregularity that are resistant to being worn away in repeated frictional contact with window glass. The above feature can be achieved if the storage elastic modulus E' and the loss tangent tan $\delta$ of the sliding member are adjusted.

Thus, the inventors discovered that the storage elastic modulus E' and loss tangent tan $\delta$ are the parameters that comprise the foundation of repeated window glass frictional contact properties, and to obtain excellent repeated frictional contact properties, the storage elastic modulus E' is preferably high and the loss tangent tan $\delta$ is preferably low.

Furthermore, the inventors investigated factors other than repeated frictional contact properties that are necessary in a weatherstrip, such as maintaining the kickback reaction and flexibility of a lip, preventing problems in the attachment of the weatherstrip to a window frame (wrinkling, bending strain, whitening), and preventing a squeaking noise and a rubbing sound. As a result, the inventors discovered that softness and restorability are important in terms of maintaining the rebound and flexibility of a lip, preventing problems in the attachment of the weatherstrip to a window frame (wrinkling, bending strain, whitening), the stickiness of wearing surface substances, and preventing a rubbing sound. It is also discovered that these can be expressed by the two parameters of storage elastic modulus E' and loss tangent tan $\delta$ Squeaking noise is correlated to wearability (wear patterns and the stickiness of wearing surface substances) and to how much mud, sand, and other such foreign matter becomes embedded. These can simultaneously be expressed by the two parameters of storage elastic modulus E' and loss tangent tan $\delta$.

Also, it was confirmed that with materials that are compatible, as opposed to a combination of various materials, as in Japanese Patent Application Laid-Open 2000-52780 and 2003-200738, unless a microstructure is formed that has a storage elastic modulus E' and loss tangent tan $\delta$ within specific ranges, the materials will separate and fall out, and as a result the wear resistance will be poor, and there will be tendency toward higher sliding resistance and more squeaking noise.

Based on these findings, the inventors conducted research into the ranges for storage elastic modulus E' and loss tangent tan $\delta$ with which the object of the present invention could be achieved, and conducted research into substances having these ranges, and the amounts in which these substances are contained. Finally, this led to the perfection of the weatherstrip of the present invention.

Specifically, the present invention relates to a weatherstrip in which the sliding part of a lip in sliding contact with window glass is covered by a sliding member, wherein the sliding member is composed of a weatherstrip composition containing the following polymer A group and polymer B group.

The present invention provides a weatherstrip composition comprising a polymer A group and a polymer B group, wherein the polymer A group is a polymer group made up of a domain 1 consisting of crosslinked product of a polymer selected from a group consisting of ethylene polymer(s), ethylene/α-olefin copolymer(s) (where the α-olefin has from 3 to 20 carbons), ethylene/α-olefin/diene copolymer(s) (where the α-olefin has from 3 to 20 carbons), homopolymer rubber(s) of a conjugated diene monomer, copolymer(s) polymerized with a conjugated diene monomer and an aromatic vinyl monomer, or hydrogenated copolymer(s) polymerized with a conjugated diene monomer and an aromatic vinyl monomer (where the hydrogenation of all double bonds except for the aromatic groups is at least 50%), and a domain 2 consisting of crosslinked product of ethylene polymer(s) or ethylene/α-olefin copolymer(s) (where the α-olefin has from 3 to 20 carbons), wherein the storage elastic modulus E' of domain 1 under conditions of a frequency of 200 Hz and a temperature of 23° C. is at least 3 GPa and less than 9 GPa, and the loss tangent tan $\delta$ is from 0.1 to 0.4, the storage elastic modulus E' of domain 2 under the same conditions is at least 9 GPa and no more than 13 GPa, and the loss tangent tan $\delta$ is from 0.1 to 0.3, and the ratio of domain 1 and domain 2 in the polymer A group (domain 1:domain 2) is from 50:50 to 95:5 (wt %) (the amount in which this polymer group is contained is from 40 to 100 wt % based on the total weight of the weatherstrip composition.), and the polymer B group is a polymer group made up of at least one thermoplastic resin selected from propylene polymer(s), ethylene/propylene copolymer(s), and ethylene/propylene/α-olefin ternary copolymer(s) (where the α-olefin has from 3 to 20 carbons), wherein the storage elastic modulus E' measured under the same conditions is from 5 GPa to 17 GPa, and the loss tangent tan $\delta$ is greater than 0.4 and no more than 0.7 (the amount in which polymer A group and polymer B group is contained is from 0 to 40 wt % based on the total weight of the weatherstrip composition).

Specifically, with the glass run channel (weatherstrip) of the present invention, the sliding part of a lip in sliding contact with window glass is covered by a sliding member, wherein 40 to 100 wt % of the total weight of the sliding member made up of the polymer A group, and 0 to 40 wt % the polymer B group, wherein the polymer A group is made up of a domain 1 consisting of crosslinked product of ethylene polymer(s), ethylene/α-olefin copolymer(s) (where the α-olefin has from 3 to 20 carbons), ethylene/α-olefin/diene copolymer(s) (where the α-olefin has from 3 to 20 carbons), homopolymer rubber(s) of a conjugated diene monomer, copolymer(s) polymerized with a conjugated diene monomer and an aromatic vinyl monomer, or hydrogenated copolymer(s) polymerized with a conjugated diene monomer and an aromatic vinyl monomer (where the hydrogenation of all double bonds except for the aromatic groups is at least 50%), and a domain 2 consisting of crosslinked product of ethylene polymer(s) or ethylene/α-olefin copolymer(s) (where the α-olefin has from 3 to 20 carbons), wherein the storage elastic modulus E' of domain 1 under conditions of a frequency of 200 Hz and a temperature of 23° C. is at least 3 GPa and less than 9 GPa, and the loss tangent tan $\delta$ is from 0.1 to 0.4, the storage elastic modulus E' of domain 2 under the same conditions is at least 9 GPa and no more than 13 GPa, and the loss tangent tan δ is from 0.1 to 0.3, and the ratio of domain 1 and domain 2 in the polymer A group (domain 1:domain 2) is from 50:50 to 95:5 (wt %), and the polymer B group is a polymer group made up of at least one thermoplastic resin selected from propylene polymer(s), ethylene/propylene copolymer(s), and ethylene/propylene/α-olefin ternary copolymer(s) (where the α-olefin has from 3 to 20 carbons), wherein the storage elastic modulus E' measured under the same conditions is from 5 to 17 GPa, and the loss tangent tan δ is greater than 0.4 and no more than 0.7.

In the weatherstrip composition according to the present invention, it is preferable that domain 2 exists in contact with domain 1, and it is especially preferable that domain 1 is interposed between domain 2 and the phase comprising polymer B. More preferably, the weatherstrip composition of the present invention further contains 5 to 20 wt % silicone compound. The present invention also provides a sliding member which is for a weather strip and covers the sliding part of a lip in sliding contact with window glass, wherein said sliding member is composed of the above-mentioned weatherstrip composition. In addition, the present invention provides a weatherstrip in which the sliding part of a lip in sliding contact with window glass is covered by a sliding member, wherein the sliding member is composed of the above-mentioned weatherstrip composition.

DESCRIPTION OF THE PREFERRED EMBODIMENTS

Preferred embodiments of the present invention will now be described in detail through reference to the drawings. Those elements that are the same are numbered the same in the description of the drawings, and redundant descriptions will be omitted. Parts of the drawings are drawn in an exaggerated manner to facilitate an understanding thereof, and the dimensional ratios may not coincide with the description.

Figure 1:
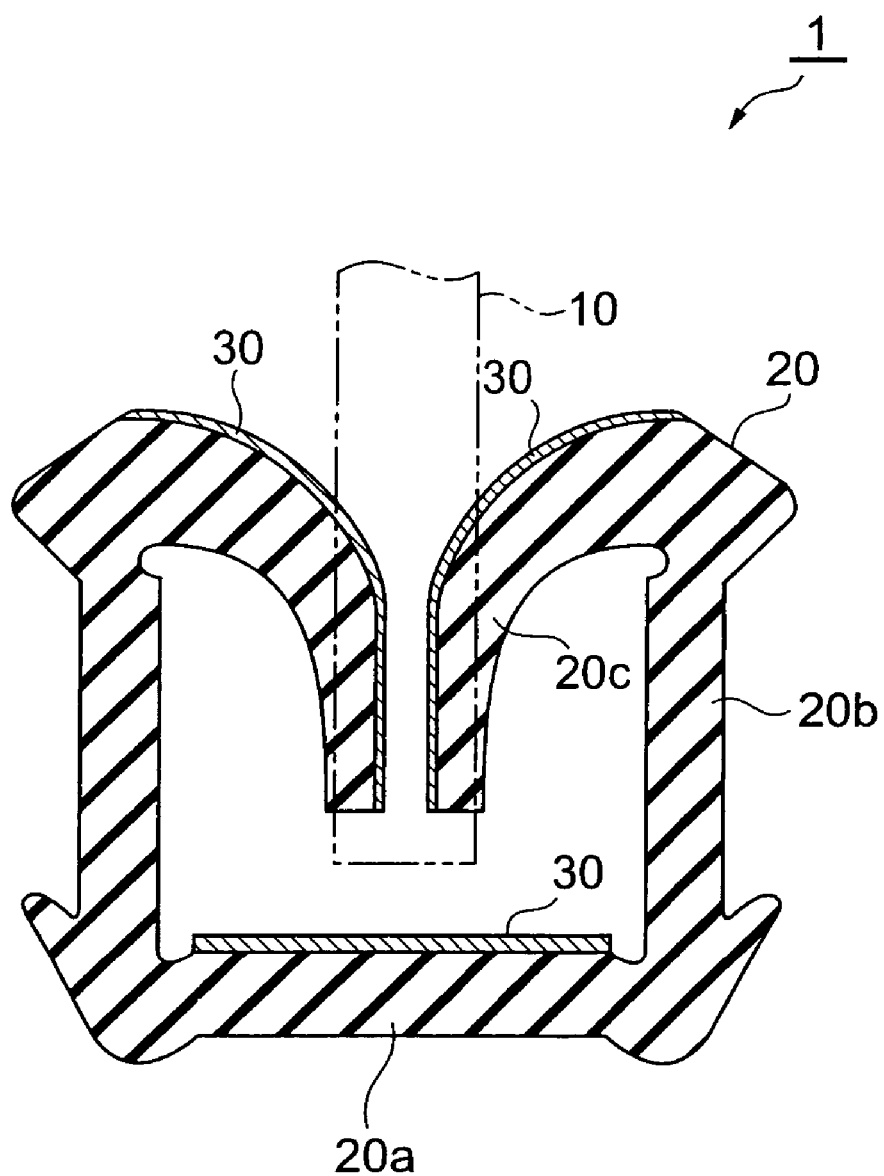
FIG. 1 is a schematic cross section of the weatherstrip pertaining to a first embodiment.

FIG. 1 is a schematic cross section of the weatherstrip pertaining to a first embodiment. The weatherstrip 1 pertaining to the first embodiment shown in FIG. 1 is made up of a weatherstrip body 20 and a sliding member 30. The weatherstrip body 20 consists of a base portion 20a, two side wall portions 20b, and lip portions 20c that extend inward from the distal ends of the side wall portions 20b. The sliding member 30 is formed over these so as to cover the surface of the base portion 20a in sliding contact with the outer peripheral edges of a window glass 10, and the sliding parts of the lip portions 20c in sliding contact with the window glass 10.

Figure 2:
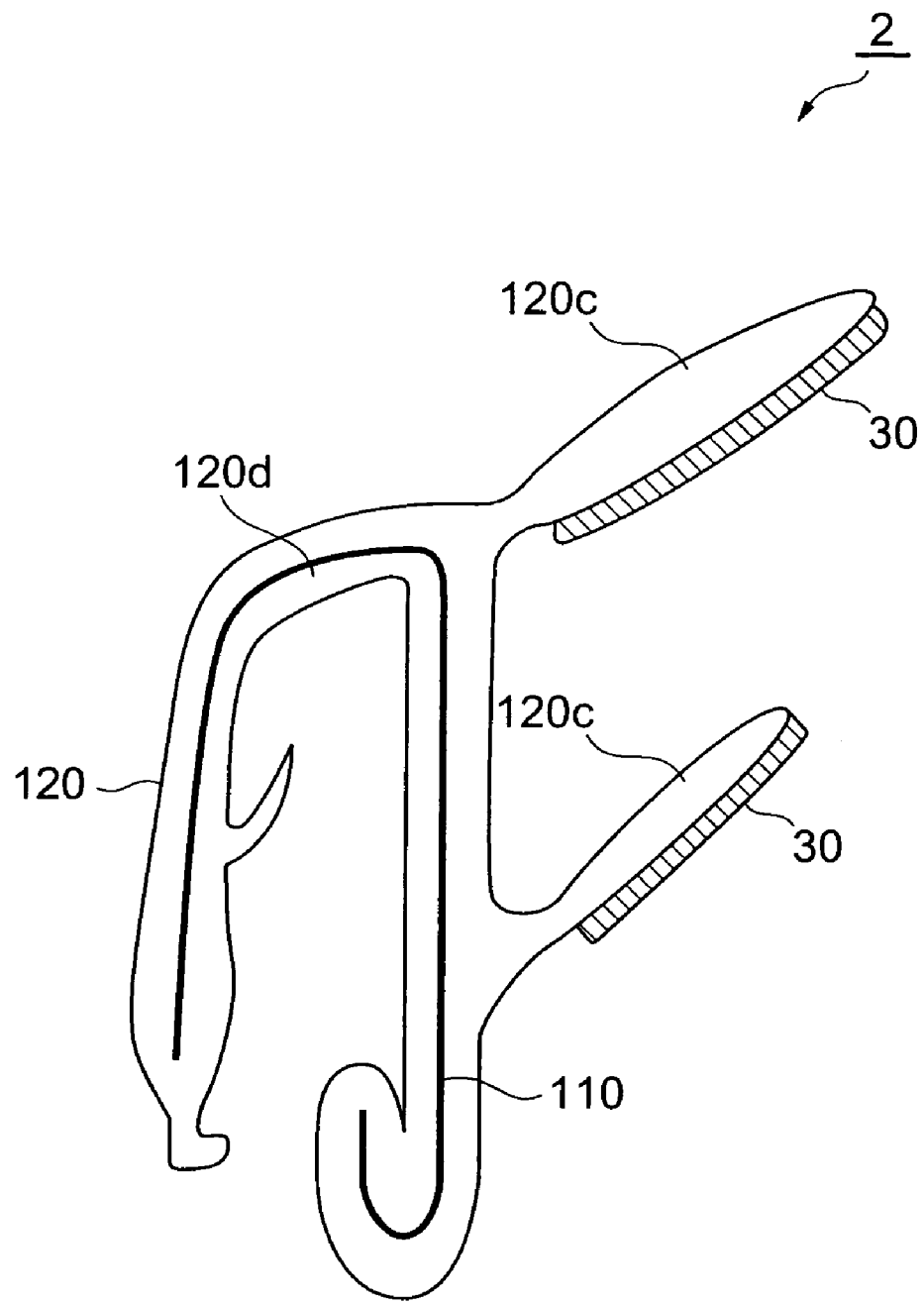
FIG. 2 is a schematic cross section of the weatherstrip pertaining to a second embodiment.

FIG. 2 is a schematic cross section of the weatherstrip pertaining to a second embodiment. The weatherstrip 2 pertaining to the second embodiment shown in FIG. 2 is made up of a weatherstrip body 120 and sliding members 30. The weatherstrip main body 120 has a core material 110, and consists of an attachment portion 120d that attaches to a vehicle, and lip portion 120c in sliding contact with the window glass. The sliding members 30 are formed on the lip portion 120c so as to cover the sliding part of the lip component 120c.

In an embodiment of the present invention, the sliding members 30 are composed of the weatherstrip composition of the present invention, which contains a polymer A group and a polymer 13 group. The weatherstrip composition may comprise the polymer A group by itself, but preferably contains the polymer A group in an amount of 40 to 100 wt %, and even more preferably 50 to 95 wt %, and even more preferably 60 to 90 wt %, with respect to the total weight of the weatherstrip composition. If the polymer A group is contained in an amount less than 40 wt %, the composition will not exhibit satisfactory sliding properties, wear resistance, and flexibility, squeaking noise and rubbing sound will not be sufficiently prevented, and the weatherstrip will be difficult to attach.

Even a weatherstrip composition composed of just the polymer A group will be easy to work by extrusion if the lip components and so forth are joined to the strip main body while not yet crosslinked, and then crosslinked. It is possible to extrude a weatherstrip composition in which the polymer A group content is 100 wt %, but the polymer A group content is preferably set to 95 wt % or lower to facilitate molding. The addition of the polymer B group improves the fluidity of the weatherstrip composition.

The polymer B group preferably accounts for 5 to 40 wt % of the total weight of the weatherstrip composition. Fluidity will be inadequate if the polymer B group content is less than 5 wt %, but sufficient fluidity can be ensured by having the polymer B group contained in an amount of 5 to 40 wt %. If the polymer B group content is over 40 wt %, though, the polymer A group will account for too low a proportion of the weatherstrip composition and the above-mentioned characteristics of the present invention will tend to suffer. The polymer B group is preferably contained in the weatherstrip composition in an amount of 10 to 40 wt %, and even more preferably 15 to 40 wt %.

In addition to the polymer A group and the polymer 13 group, the weatherstrip composition of the present invention can contain, silica, carbon black, or other such reinforcing agents, pigments, antioxidants, light stabilizers, thermoplastic resins, elastomers, mildew resistance, antibacterial agents, flame retardants, lubricants and softeners based on paraffin or the like, lubricants based on silicone, fluorine, or the like, and so forth.

The polymer A group consists of two domains: domain 1 and domain 2. The primary functions of domain 1 are to impart flexibility to the sliding members, facilitate attachment, and prevent the generation of a rubbing sound, without greatly compromising sliding performance. This domain 1 consists of crosslinked ethylene polymers, ethylene/α-olefin copolymers (where the α-olefin has from 3 to 20 carbons), ethylene/α-olefin/diene copolymers (where the α-olefin has from 3 to 20 carbons), homopolymer rubbers of a conjugated diene monomer, copolymers composed of a conjugated diene monomer and an aromatic vinyl monomer, or hydrogenated copolymers composed of a conjugated diene monomer and an aromatic vinyl monomer and in which the hydrogenation of all double bonds except for the aromatic groups is at least 50%.

Examples of the above-mentioned ethylene polymers include ethylene homopolymers as well as copolymers of ethylene and methyl acrylate, copolymers of ethylene and ethyl acetate, and other such copolymers of ethylene and an α,β-unsaturated carboxylic acid derivative, and copolymers of ethylene and an α,β-unsaturated carboxylic acid, copolymers of ethylene and vinyl acrylate and other such copolymers of ethylene and a vinyl ester, and ternary ethylene copolymers (also called (meth)acrylic rubbers) such as copolymers of ethylene, methyl acrylate, and an unsaturated carboxylic acid.

Examples of the α-olefin in the above-mentioned ethylene/α-olefin copolymers (where the α-olefin has from 3 to 20 carbons) and ethylene/α-olefin/diene copolymers (where the α-olefin has from 3 to carbons) include propylene, 1-butene, 1-pentene, 1-hexene, 4-methyl-1-pentene, 1-octene, 1-decene, and combinations of these. Examples of the diene in the above-mentioned ethylene/α-olefin/diene copolymers include ethylidene norbornene (ENB), vinyl norbornene, 1,4-hexadiene(1,4-HD), methylene norbornene(MNB), isopropylidene norbornene, 1,6-octadiene, 5-methyl-1,4-hexadiene, 3,7-dimethyl-1,6-octadiene, 1,3-cyclopentadiene, dicyclopentadiene, and combinations of these.

Ethylene polymers and ethylene/α-olefin copolymers include LDPE, LLDPE, VLDPE, and high-density polyethylene with a number average molecular weight of from 50,000 to 300,000.

Examples of the above-mentioned homopolymer rubbers of a conjugated diene monomer include butadiene rubber, isoprene rubber, chloroprene rubber, and butyl rubber.

The copolymers composed of a conjugated diene monomer and an aromatic vinyl monomer, and of hydrogenated copolymers composed of a conjugated diene monomer and an aromatic vinyl monomer and in which the hydrogenation of all double bonds (except for the aromatic groups) is at least 50%, include, for example, SBS, SIS, SBBS, SEBS, SEPS, SEEPS, SBR rubber, and hydrogenated copolymers of these.

Domain 1 can be adjusted to the desired storage elastic modulus E' and loss tangent tan δ by crosslinking these polymers. These crosslinked polymers, that is, the polymers of domain 1, have excellent compatibility and adhesion to the polymers of domain 2 and polymer B group.

The primary functions of domain 2 are to improve sliding performance and impart wear resistance, and these polymers are composed of crosslinked ethylene polymers or ethylene/α-olefin copolymers (where the α-olefin has from 3 to 20 carbons). The ethylene polymers and ethylene/α-olefin copolymers may be used without modification, or may be partially modified, such as grafting a functional group such as an unsaturated group so as to facilitate the crosslinking reaction.

Examples of the above-mentioned ethylene polymers are the same as those listed for domain 1, and Examples of the above-mentioned ethylene/α-olefin copolymers (where the α-olefin has from 3 to 20 carbons) are also the same as those listed for domain 1. The above-mentioned ethylene polymers and ethylene/α-olefin copolymers preferably have a number average molecular weight of from 500,000 to 7,000,000. The crosslinked product of these ethylene resins has excellent compatibility and adhesion to the polymers of domain 1. Domain 2 can be adjusted to the desired storage elastic modulus E' and loss tangent tan δ by crosslinking these ethylene resins. When an ethylene resin is crosslinked, the crosslinked structure increases the storage elastic modulus E', inhibits crystallization, and allows a low loss tangent tan δ to be obtained. If the number average molecular weight of the above-mentioned ethylene polymers and ethylene/α-olefin copolymers is between 500,000 and 7,000,000, it will be easier to adjust the storage elastic modulus E' and loss tangent tan δ to the desired values.

When the crosslinked product having a number average molecular weight of from 500,000 to 7,000,000 which consists of ethylene polymers and ethylene/α-olefin copolymer is used as domain 2, the compatibility and adhesion of domain 2 and polymer B group may be insufficient. Therefore, in the weatherstrip composition which consists of only domain 2 and polymer B group, separation and omission of domain 2 occur and it can be difficult to obtain sufficient sliding properties and wear resistance. Because domain 1 has compatibility and adhesion to both domain 2 and polymer B group, it is interposed between domain 2 and polymer B group to fix them, and it has the function of preventing the separation and omission of domain 2 from the weatherstrip composition.

Domains 1 and 2 are obtained by utilizing the hydrocarbon component or unsaturated component of the above-mentioned raw materials and using a crosslinking agent such as a metal oxide, an organic polyvalent amine, sulfur or a sulfur compound, a phenol resin curing agent, a hydrosilylation agent (and hydrosilylation catalyst), or an organic peroxide to perform a treatment such as heating or irradiation with an electron beam or UV rays.

A peroxyketal, dialkyl peroxide, peroxy ester, diacyl peroxide, peroxydicarbonate, or the like is used as an organic peroxide.

Examples of crosslinking agents that are favorable for crosslinking domain 2 include 1,1-di(t-hexylperoxy)cyclohexane, 1,1-di(t-hexylperoxy)-3,3,5-trimethylcyclohexane, 1,1-di(t-butylperoxy)cyclohexane, n-butyl-4,4-di(t-butylperoxy)valerate, dicumyl peroxide, 2,5-dimethyl-2,5-di(t-butylperoxy)hexane, di(2-t-butylperoxyisopropyl)benzene, t-butyl cumyl peroxide, di-t-hexyl peroxide, di-t-butyl peroxide, 2,5-dimethyl-2,5-di(t-butylperoxy)hexyne-3,2,5-dimethyl-2,5-di(benzoylperoxy)hexane, t-hexylperoxybenzoate, t-butylperoxy-3-methylbenzoate, diisopropylperoxydicarbonate, di(4-t-butylcyclohexyl)peroxycarbonate, and 1,6-bis(t-butylperoxycarbonyloxy)hexane.

Examples of hydrosilylation agents include methyl hydrogen polysiloxane, methyl hydrogen alkylmethyl polysiloxane, and other such silicon hydride compounds. Examples of hydrosilylation catalysts include hexachloroplatinic acid, chloroplatinic acid, platinum oxide, platinum complexes, and other such platinum-containing catalysts.

Examples of phenol resin curing agents include alkylphenolformaldehyde resin, methylolated alkylphenol resin, bromoalkylphenol resin, and other such halogenated phenol resins. In general, with a non-halogenated phenol resin, it is used along with a hydrogen halogenide remover (acid acceptor), such as zinc oxide, and a halogen donor, such as stannic chloride, as a catalyst. With a halogenated phenol resin, it is used along with a hydrogen halogenide remover (acid acceptor) if necessary.

There are no restrictions on the size of domains 1 and 2, but usually one about 0.05 to 300 μm, or one with a continuous phase is used. Nor are there any restrictions on the shape of domains 1 and 2. The size and shape of domains 1 and 2 are suitably determined according to the required surface roughness and appearance of the finished product. The dispersion state of domains 1 and 2 in the sliding members, and the size thereof, can be confirmed by SEM, XPM, AFM, nano-indentation, or other such method.

Figure 3:
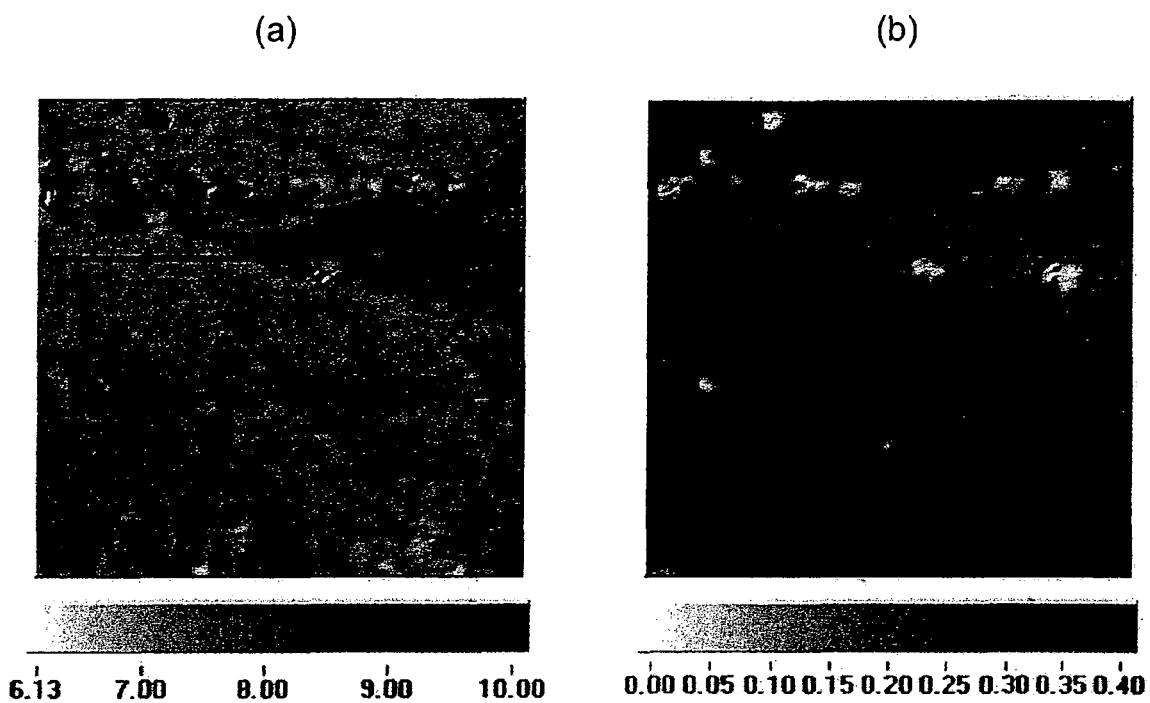
FIG. 3a is a mapping image obtained by measuring the storage elastic modulus E' of the weatherstrip composition of the present invention with a super-light load thin-film hardness tester.
FIG. 3b is a mapping image obtained by measuring the loss tangent tan δ of the weatherstrip composition of the present invention with a super-light load thin-film hardness tester.
Figure 4:
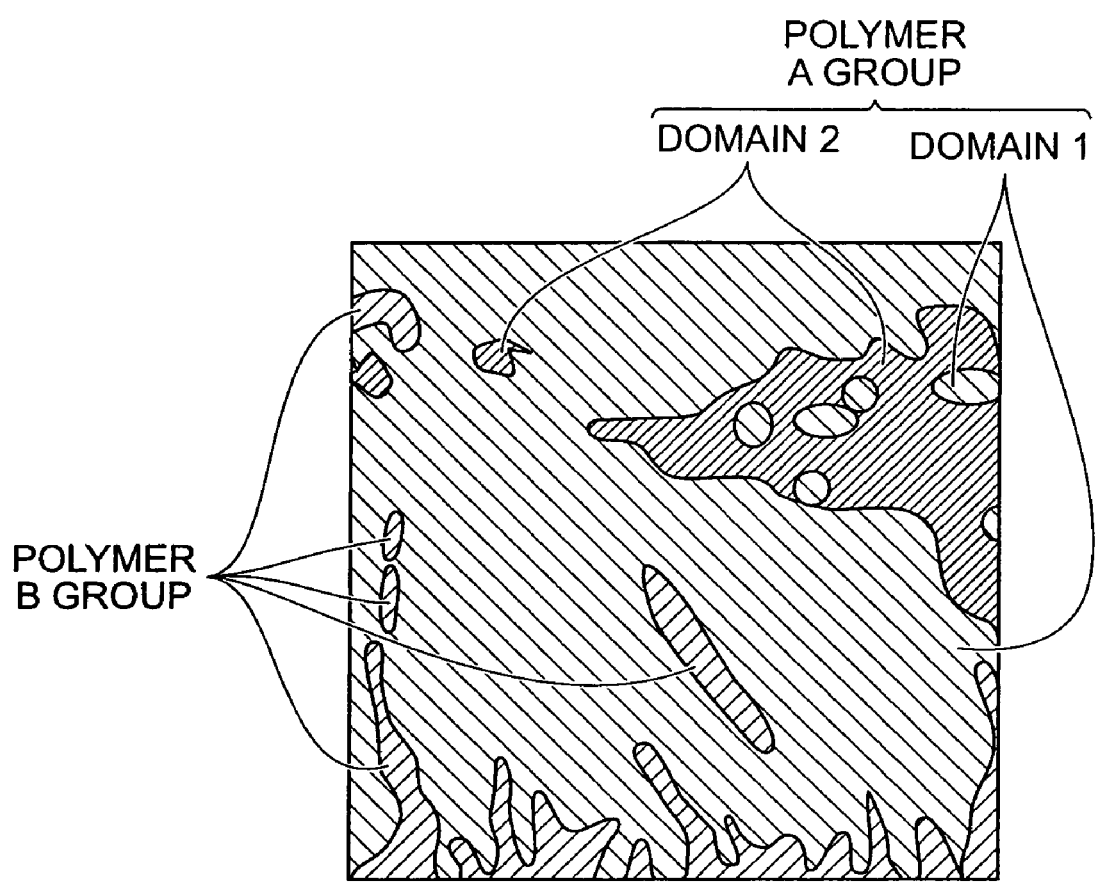
FIG. 4 is a model diagram of the morphology of the weatherstrip composition of the present invention.

FIG. 3 consists of mapping images taken over a measurement range of 100 square micrometers (one side 10 μm), obtained by measuring the storage elastic modulus E' (a) and loss tangent tan δ (b) of the weatherstrip composition of the present invention (sliding member 30 in FIG. 1) with a super-light load thin-film hardness tester (Tribo Indenter, trade name of Hysitron Inc.). FIG. 3a is a mapping image obtained by measuring the storage elastic modulus E' of the weatherstrip composition of the present invention with a super-light load thin-film hardness tester. FIG. 3b is a mapping image obtained by measuring the loss tangent tan δ of the weatherstrip composition of the present invention with a super-light load thin-film hardness tester. FIG. 4 is a model diagram of the morphology of the weatherstrip composition of the present invention, as estimated from the images of FIG. 3. In the weatherstrip composition according to the present invention, domain 1 is interposed between domain 2 and the phase comprising polymer B group. Also, a part of domain 1 is dispersed in domain 2. Because of this morphology, the weatherstrip composition of the present invention has excellent sliding properties and wear resistance.

Domain 1 must be such that the storage elastic modulus E' measured at a frequency of 200 Hz and a temperature of 23° C. is at least 3 GPa and less than 9 GPa, and the loss tangent tan δ is within a range of 0.1 to 0.4. Domain 2, meanwhile, must be such that the storage elastic modulus E' measured under the same conditions is at least 9 GPa and no more than 13 GPa, and the loss tangent tan δ is within a range of 0.1 to 0.3. The magnitude of the storage elastic modulus E' indicates the elastic modulus during compression recovery of domains 1 and 2. The loss tangent tan δ is the ratio (E"/E') of the storage elastic modulus E' and the loss elastic modulus E", and the magnitude of the loss tangent tan δ is an index of whether domains 1 and 2 are viscous bodies or elastic bodies.

If the storage elastic modulus E' of domain 1 is greater than or equal to 9 GPa, or the storage elastic modulus E' of domain 2 is over 13 GPa, the composition will not have adequate flexibility, attachment will be difficult, and a rubbing sound will be generated. If the storage elastic modulus E' of domain 1 is under 3 GPa, or the storage elastic modulus E' of domain 2 is under 9 GPa, it will be impossible to obtain excellent sliding performance (low resistance and good wear resistance).

If the loss tangent tan δ of domains 1 and 2 is less than 0.1, preparing the above-mentioned sliding members will be difficult, but if the loss tangent tan δ of domain 1 is over 0.4, or the loss tangent tan δ of domain 2 is over 0.3, sliding resistance will be higher and slidability will decrease, and wear resistance will also be lost.

These sliding members are made up primarily of the polymer A group and the polymer B group, and if the storage elastic modulus E' of the polymer A group is under 3 GPa, or the storage elastic modulus E' of the polymer B group is under 5 GPa, sliding resistance will be higher, and wear resistance will be lost. If the storage elastic modulus E' of the polymer A group is over 13 GPa, or the storage elastic modulus E' of the polymer 13 group is over 17 GPa, there will tend to be more squeaking against the window glass, deformation of the lip, rattling of the window glass, and scratching of the window glass by dust.

With the present invention, since domains 1 and 2 are made up of the above-mentioned materials that have been crosslinked, it is easy to adjust the storage elastic modulus E' and loss tangent tan δ of domains 1 and 2 to within the above-mentioned ranges. Specifically, the storage elastic modulus E' and loss tangent tan δ can be adjusted to within the above-mentioned ranges by suitably adjusting the degree of crosslinking.

The values for storage elastic modulus E' and loss tangent tan δ specified in this Specification are measured by nano-indentation method using a super-light load thin-film hardness tester made by Hysitron. A super-light load thin-film hardness tester is able to measure not only the reduced modulus of microscopic portions, but also the dynamic viscoelasticity. Thus, values for the storage elastic modulus E', the loss elastic modulus E", and the loss tangent tan δ can be obtained by the tester.

The ratio of domain 1 and domain 2 in the polymer A group (domain 1:domain 2) is from 50:50 to 5:95 (wt %) in the weatherstrip of the present invention. If the ratio is outside this range, the sliding members will be too hard, flexibility will be lost, and lip deformation will occur, or there will be whitening during attachment to the window frame, among other such problems.

From 40 to 100 wt % of the total weight of the sliding members covering the sliding parts of the lip can be accounted for by the above-mentioned polymer A group, and 0 to 40 wt % by the polymer B group, which is composed of at least one thermoplastic resin selected from among propylene polymers, ethylene/propylene polymers, and ethylene/propylene/α-olefin ternary copolymers (where the α-olefin has from 3 to 20 carbons). Examples of the α-olefin of the above-mentioned ethylene/propylene/α-olefin ternary copolymers include 1-butene, 1-pentene, 1-hexene, 4-methyl-1-pentene, 1-octene, 1-decene, and combinations of these.

The polymer B group has a storage elastic modulus E' measured at a frequency of 200 Hz and a temperature of 23° C. of from 5 GPa to 17 GPa, and preferably 8 GPa to 16 GPa, and a loss tangent tan δ of from 0.3 to 0.5, and preferably 0.3 to 0.4. Adding the polymer B group ensures that the sliding members will have adequate fluidity, and this allows extrusion molding, injection molding, and other such molding methods to be employed.

A silicone compound is preferably added to the sliding members in an amount of 5 to 20 wt %. A silicone compound acts as a lubricant, and the addition of a silicone compound allows low sliding resistance to be ensured and wear resistance to be increased, even under repeated frictional contact between the window glass and the sliding members. The above effect will not be achieved if the silicone compound is added in an amount less than 5 wt %, but the sliding members may become brittle if the amount is over 20 wt %.

The above-mentioned silicone compound used in the present invention is a silicone oil, silicone rubber, or silicone copolymer. Examples of silicone oil and silicone rubber include dimethylsilicone, methylphenylsilicone, these silicones containing no more than 5 mol % vinyl groups, hydrogen polysiloxane, and modified silicone oils that have been modified with an alkyl, a high fatty acid ester, fluorine, or the like. Chain-molecule dimethylpolysiloxane (dimethylsilicone oil, gum or rubber) having a vinyl group content of less than 1 mol % and a number average molecular weight of from $10^2$ to $10^6$, Chain-molecule methyl hydrogen polysiloxane, or methyl hydrogen polysiloxane having an alkylene group is particularly favorable of the excellent weather resistance and retention of sliding performance.

Meanwhile, the above-mentioned silicone copolymer is obtained by copolymerizing one of the various silicone compounds discussed in regard to silicone oil and silicone gum (rubber) with another monomer and another resin. This silicone copolymer may be a commercially available copolymer, or may be produced by reaction, and specific Examples include a copolymer of silicone and acrylic (Chaline R, trade name of Nissin Chemical Industry), a copolymer of silicone and olefin (Silicone Concentrate, trade name of Toray Dow Corning), and the partially crosslinked product of dimethyl vinyl polysiloxane containing 0 to 1 mol % vinyl groups and EPDM, SBS, or SIS containing 0 to 5 wt % unsaturated groups.

The thickness of the sliding members 30 covering the sliding parts of the lip portions 20*c* and 120*c* may be suitably determined after taking into account the size of the window glass, the force to support glass, the kickback reaction of the lip, and other such factors. The proper thickness is usually between 20 and 200 μm. Outside this range, the molding will be difficult, the abrasive resistance of the main body material is reduced, and the lip will not hold the window glass as well, and there will tend to be more deformation of the lip. There are no restrictions on the thickness of the sliding members 30 that cover the base, since they only need to be capable of sliding. However, greater thickness results in higher long-term reliability, and the range is usually from 50 to 1500 μm.

There are no particular restrictions on the portions other than the sliding members in the weatherstrip of the present invention. The sliding members may be made of any commonly used materials, namely, any of various thermoplastic elastomers such as styrene-based thermoplastic elastomers (TPS, TPV-S) or polyolefin-based thermoplastic elastomers (TPO, TPV-O) in which a crosslinked EPDM (copolymer of ethylene, propylene, and a non-conjugated diene) is dispersed in a polyolefin resin. A thermosetting elastomer may also be used. Examples of thermosetting elastomers include EPDM and mixtures of EPDM and SBR, EPDM and IR, or the like.

Examples of the above-mentioned polyolefin resins include ethylene polymers, propylene polymers, ethylene/propylene copolymers (block copolymers and random copolymers), ethylene/propylene/α-olefin copolymers (block copolymers and random copolymers), ethylene/α-olefin copolymers (HDPE, LDPE, flexible olefins), propylene/α-olefin copolymers (block copolymers and random copolymers), ethylene/acrylic copolymers (such as EEA), ethylene/vinyl alcohol copolymers (EVOH), copolymers including propylene other than those listed above, and the above materials that have been modified with maleic acid, those to which hydroxyl groups have been added, and those modified with silane.

The weatherstrip of the present invention can be manufactured by the following method.

First, there are no particular restrictions on the manufacturing method of the sliding members, so long as the raw materials of the polymer A group (the raw material of domain 1 and the raw material of domain 2) are adjusted by crosslinking to the specific storage elastic modulus E' and loss tangent tan δ given above, and the product is finally obtained in a form in which three components are mixed, including the polymer B group.

For example, as shown in column [a] of Table 1, the raw materials of the polymer A group (the raw material of domain 1 and the raw material of domain 2), the raw material of the polymer B group, and a crosslinking agent may be kneaded and blended in a twin screw extruder or other such kneading apparatus to manufacture the sliding members as pellets in a single step. Otherwise, as shown in columns [b] to [g] of Table 1, the process may be divided into a plurality of steps, in which the raw materials of the polymer A group are crosslinked and then mixed to manufacture the sliding members. In Table 1, a "O" indicates that the material listed in the left column was added.

The sliding members are preferably made into pellets, but an intermediate product of a plurality of steps may be pellets or may be in block form. When a silicone compound, pigment, or any of various other additives are added, they may be mixed and kneaded as necessary in any kneading step. In this case, the added proportions are adjusted to within the ranges specified in the present invention by setting the proportion of the raw material of domain 1 to between 20 and 90 wt %, the raw material of domain 2 to between 2 and 48 wt %, the raw material of the polymer B group to between 0 and 40 wt % (when the polymer B group is added, the proportion is between 5 and 40 wt %), and the silicone compound, pigment, or other additives to between 0 and 25 wt %.

TABLE 1

| Manufacturing method of sliding member | [a] | [b] | [c] | [d] | [e] | [f] | [g] |
|---|---|---|---|---|---|---|---|
| Kneading step 1 | | | | | | | |
| Raw material of domain 1 | O | O | — | — | — | O | O |
| Raw material of domain 2 | O | O | O | O | O | O | O |
| Raw material of polymer B group | O | — | O | O | — | O | — |
| Crosslinking agent | O | O | O | O | O | O | O |
| Kneading step 2 | | | | | | | |
| Raw material of domain 1 | | O | O | O | O | O | O |
| Raw material of domain 2 | | — | — | — | — | — | — |
| Product of kneading step 1 | | — | — | — | — | — | O |
| Raw material of polymer B group | | O | O | — | — | O | O |
| Crosslinking agent | | O | O | O | O | O | O |
| Kneading step 3 | | | | | | | |
| Product of kneading step 1 | | O | O | O | O | O | |
| Product of kneading step 2 | | O | O | O | O | O | |
| Raw material of polymer B group | | — | — | — | O | — | |

As for the method for manufacturing the sliding members, it is desirable that domain 1 and domain 2 easily contact each other. In other words, it is preferable to treat the materials of domain 1 and the materials of domain 2 at the same kneading step. Columns [a], [b], [f], and [g] of Table 1 are preferable as the manufacturing method. Moreover, it is preferable to knead the materials of domains 1 and 2 (if there are polymer B group and other ingredients, these materials are also included) without adding a crosslinking agent, then add a crosslinking agent to achieve dynamic crosslinking. It becomes easy to achieve morphology in which domain 2 is dispersed in domain 1, morphology in which domain 1 is dispersed in domain 2 and morphology in which polymer B group infiltrates domain 1 by using the above-mentioned manufacturing method. Furthermore, the adhesion by the co-crosslinking reaction of domain 1 and domain 2 (if there is polymer B group, it is also included) improves by performing dynamic crosslinking treatment for the materials of domains 1 and 2 (if there is polymer B group, it is also included) at the same kneading step.

As an example, the method for manufacturing the sliding member in column [b] of Table 1 will be described. In kneading step 1, all of the raw material of domain 2 is mixed with part of the raw material of domain 1, then sent to a twin screw extruder and kneaded. Afterwards, a crosslinking agent is supplied from the twin screw extruder side, a crosslinking reaction is conducted, and the product is pelletized. If the crosslinked product here is under high resin pressure, open extrusion may be performed and the product manufactured as a crosslinked block.

To crosslink domain 2 in kneading step 1 and adjust the storage elastic modulus F and loss tangent tan δ to within the specified ranges, the crosslinking agent is preferably an organic peroxide with high reactivity and high crosslinking efficiency. It is preferably favorable to use 2,5-dimethyl-2,5-di(t-butylperoxy)hexane, 2,5-dimethyl-2,5-di(t-butylperoxy)hexyne-3 or 1,6-bis(t-butylperoxycarbonyloxy)hexane.

The storage elastic modulus E' and loss tangent tan δ of the domains 1 and 2 can be adjusted to the ranges given above by conducting this crosslinking reaction under dynamic heat treatment. Examples of the raw material of domain 2 include an ultra-high molecular weight polyethylene resin with a number average molecular weight of from 500,000 to 7,000,000, and a high-rigidity PP-PE copolymer whose flexural modulus is over 500 MPa. Examples of the raw material of domain 1 include SBS, SIS, SEBS, SEPS, SBR rubber, and hydrogenated copolymers of these, polyethylene with a number average molecular weight of from 50,000 to 300,000, PP-PE-based reactor TPO, EP rubber, EPDM rubber, isoprene rubber, butadiene rubber, and (meth)acrylic rubber. These are widely available commercially, all of which can be used. However, when they are marketed as an oil-added product (containing a softener), the amount contained in the sliding member is adjusted to be between 20 and 90 wt %, taking into account the domain 1 added in kneading step 2 (discussed below), and subtracting the amount of this softener. The product of kneading a polyethylene with a number average molecular weight of about 3,000,000 and a polyethylene of less than 300,000, such as Lubmer (Mitsui Chemical), can be used favorably as the raw material of domains 1 and 2.

When an organic peroxide is used as a crosslinking agent, the amount used is usually from 0.01 to 10 mass parts per 100 mass parts of the raw material of domains 1 and 2. If the organic peroxide is used in an amount less than 0.01 mass parts, crosslinking may be inadequate, but if the amount is over 10 mass parts, there will be an excess, which is disadvantageous in terms of cost.

In kneading step 2, meanwhile, the rest of the raw material of domain 1 is kneaded with the polymer B group, then an organic peroxide, a hydrosilylation agent (and hydrosilylation catalyst), a phenol resin curing agent, or another such crosslinking agent is added and kneaded, and dynamic crosslinking is performed in the same manner as in kneading step 1. Examples of the raw material of domain 1 are the same as those given for kneading step 1 above. For instance, when EPDM is used for the raw material of domain 1, and PP is used for the polymer B group, pellets of a dynamic crosslinking type of olefin-based thermoplastic elastomer (TPV-O) are obtained. When SEBS, SEPS, or SEEPS is used for the raw material of domain 1, and PP is used for the polymer B group, a dynamic crosslinking type of styrene-based thermoplastic elastomer (TPV-S) is obtained. Kneading step 2 may be omitted by using a commercially available TPV-O or TPV-S.

Next, the crosslinked products obtained in kneading steps 1 and 2 (pellets or a crosslinked block) are kneaded in a Banbury mixer, a twin screw extruder, or the like to produce pellets for a sliding member. Next, the material for forming the main body of a weatherstrip is sent to one of two extruders connected to a die for forming a weatherstrip, and the sliding member pellets are sent to the other extruder. The main body material and the sliding members are then discharged from their respective extruders, merged inside the die, and integrally extrusion molded (coextrusion), which produces the weatherstrip of the present invention, in which the main body and the sliding members are bonded together.

EXAMPLES

The present invention will now be described in detail through Examples, but is not limited in any way by or to these Examples.

Examples 1 to 4 and Comparative Examples 1 to 3

Kneading Step 1

In Examples 1 to 4 and Comparative Examples 1 and 2, a styrene-butadiene block copolymer (SBS), high-density polyethylene (HDPE), ultra-high molecular weight polyethylene (UHMW-PE), silicone oil, and black pigment were blended as the materials of a crosslinked block in the proportions shown in Table 2. These materials were kneaded in a twin screw extruder heated to 190° C., at a screw speed of 200 rpm and at a feed rate of 100 kg/hr, to produce pellets. The percentages given in Table 2 are weight percentages.

An organic peroxide (2,5-dimethyl-2,5-di(t-butylperoxy)hexane) was added in the amount shown in Table 2 (per 100 mass parts of pellets) to the pellets. The components were mixed so that the organic peroxide adhered to the pellets. Afterwards, this product was kneaded in a twin screw extruder heated to 160° C., at a screw speed of 200 rpm and at a feed rate of 50 kg/hr, and a crosslinking reaction was conducted to produce a crosslinked block of 2 to 130 mm. In Comparative Example 3, the components were mixed in the proportions shown in Table 2, and crosslinked in a twin screw extruder heated to 160° C., at 200 rpm and at a feed rate of 7 kg/hr. This produced a powder and a block of about 2 to 6 mm.

Next, this crosslinked block was pulverized in a pulverizer with a punch hole diameter of 5 mm, to produce crosslinked blocks of 5 mm or smaller, which are easier to feed into a kneader.

Kneading Step 2

Meanwhile, ethylene-propylene-diene rubber (EPDM), polypropylene (PP), hydrogen polysiloxane, silica, phenol-based antioxidant, and black pigment were blended in the proportions given in Table 2, kneaded in a Banbury mixer, and passed through an extruder to produce pellets.

A platinum-based catalyst in the amount shown in Table 2 (per 100 mass parts of pellets) was added to the pellets. The components were mixed and then kneaded in a twin screw extruder at a screw speed of 200 rpm, a feed rate of 100 kg/hr, and a temperature of 190° C., and a crosslinking reaction was conducted to produce pellets of a dynamic crosslinking type of thermoplastic elastomer (TPV).

Kneading Step 3

Next, the above-mentioned crosslinked blocks, the above-mentioned dynamic crosslinking type of thermoplastic elastomer pellets, a silicone-based sliding agent, a silicone oil, and a U.V. light absorber and light stabilizer (UVA, HALS) and PP were blended in the proportions shown in Table 2 and kneaded in a twin screw extruder to produce sliding member pellets.

Next, an olefin-based elastomer, which was the material for forming the main body of a weatherstrip, was sent to one of two extruders connected to a die for forming a weatherstrip. The sliding member pellets were sent to the other extruder. The main body material and the sliding members were then discharged from their respective extruders, merged inside the die, and integrally extrusion molded. This produced a weatherstrip in which the main body and the sliding members were bonded together (Examples 1 to 4 and Comparative Examples 1 to 3). The thickness of the sliding members bonded to the sliding part of the lip in sliding contact with the window glass was 100 μm. The properties of the sliding members bonded to the sliding part of the lip of this weatherstrip were evaluated by the methods described below.

The measurement conditions of dynamic viscoelasticity by nano DMA mode were as follows.
Probe: Berkovich tip (included angle: 115°)
Frequency: 200 Hz
Temperature: 23° C.

TABLE 2

|  | Ex. 1 | Ex. 2 | Ex. 3 | Ex. 4 | C. Ex. 1 | C. Ex. 2 | C. Ex. 3 |
|---|---|---|---|---|---|---|---|
| Crosslinked block |  |  |  |  |  |  |  |
| SBS (%) | 40.00 | 40.00 | 40.00 | 35.00 | 47.50 | 40.00 | — |
| HDPE (%), Mw = 130,000 | 40.00 | 40.00 | 40.00 | 10.00 | 47.50 | 40.00 | — |
| UHMW-PE (%), Mw = 3,500,000 | 15.00 | 15.00 | 15.00 | 50.00 | 0.00 | 15.00 | 100.00 |
| Silicone oil (%) | 2.00 | 2.00 | 2.00 | 2.00 | 2.00 | 2.00 | — |
| Black pigment (%) | 3.00 | 3.00 | 3.00 | 3.00 | 3.00 | 3.00 | — |
| Organic peroxide (mass parts) | 0.70 | 0.35 | 0.70 | 0.70 | 0.70 | 0.70 | 0.70 |
| TPV |  |  |  |  |  |  |  |
| EPDM (%) | 45.00 | 57.04 | 45.00 | 45.00 | 45.00 |  | 45.00 |
| PP (%) | 47.00 | 34.96 | 47.00 | 47.00 | 47.00 |  | 47.00 |
| Hydrogen polysiloxane (%) | 2.25 | 2.85 | 2.25 | 2.25 | 2.25 |  | 2.25 |
| Silica (%) | 2.25 | 1.65 | 2.25 | 2.25 | 2.25 |  | 2.25 |
| Antioxidant (%) | 0.50 | 0.50 | 0.50 | 0.50 | 0.50 |  | 0.50 |
| Black pigment (%) | 3.00 | 3.00 | 3.00 | 3.00 | 3.00 |  | 3.00 |
| Platinum-based catalyst (mass parts) | 2.30 | 2.30 | 2.30 | 2.30 | 2.30 |  | 2.30 |
| Sliding member |  |  |  |  |  |  |  |
| Crosslinked block (%) | 42.00 | 65.50 | 24.00 | 42.00 | 42.00 | 24.00 | 42.00 |
| TPV (%) | 42.00 | 31.00 | 53.00 | 42.00 | 42.00 | 0.00 | 42.00 |
| Silicone sliding agent (65% silicone) | 12.50 | 0.00 | 12.50 | 12.50 | 12.50 | 12.50 | 12.50 |
| Silicone oil (%) | 2.50 | 2.50 | 2.50 | 2.50 | 2.50 | 2.50 | 2.50 |
| PP (%) | 0.00 | 0.00 | 7.00 | 0.00 | 0.00 | 60.00 | 0.00 |
| U.V. light absorber and light stabilizer (%) | 1.00 | 1.00 | 1.00 | 1.00 | 1.00 | 1.00 | 1.00 |
| Proportion of polymer A group (%) | 56.0 | 79.3 | 45.2 | 57.8 | 57.6 | 22.1 | 59.4 |
| Domain 1/polymer A group (%) | 89.1 | 88.8 | 92.2 | 64.4 | 99.0 | 84.7 | 30.5 |
| Domain 2/polymer A group (%) | 10.9 | 11.2 | 7.8 | 35.4 | 0.0 | 15.3 | 69.5 |
| Proportion of polymer B group (%) | 18.6 | 10.9 | 30.0 | 18.1 | 18.7 | 59.7 | 18.2 |
| Slidability | excell. | excell. | good | excell. | poor | fair | poor |
| Wear resistance | excell. | good | good | excell. | poor | fair | poor |
| Chattering | excell. | excell. | excell. | excell. | fair | poor | poor |
| habit level | excell. | excell. | excell. | excell. | excell. | poor | poor |
| Squeaking | excell. | excell. | excell. | good | excell. | poor | fair |
| Surface roughness (Ra) | 2.0 | 0.3 | 1.5 | 2.3 | 2.2 | 0.8 | 19.8 |

[Ex.: Example; C Ex.: Comparative Example; excell.: excellent]

Evaluation Methods (1) Evaluation of proportion of sliding member accounted for by polymer A group (%), proportion of polymer A group accounted for by domain 1 (%), proportion of polymer A group accounted for by domain 2 (%), and proportion of sliding member accounted for by polymer B group (%)

The above-mentioned proportions were measured as follows for the sliding members (5000 μm$^2$ in size) pertaining to Examples 1 to 4 and Comparative Examples 1 to 3.

The storage elastic modulus E' and loss tangent tan δ were measured as follows. Part of the lip including the sliding member of the weatherstrip was cut out and used as a test piece. The cut test piece was then molded with a cold-setting epoxy resin. This gave a rectangular parallelepiped molded article with a bottom face measuring 4 mm×10 mm and a height of approximately 15 mm. The molded article was sliced with a cutter parallel to the bottom face so that a cross section of the test piece would be exposed, and so that this cross section of the test piece would be smooth. The cross section of the test piece thus formed was used as the measuring plane. The storage elastic modulus E' and loss tangent tan δ were measured using a super-light load thin-film hardness tester (Tribo Indenter, trade name of Hysitron Inc.). The measurements were made at an indentation depth of about 30 to 110 nm because depth was controlled by giving priority to the maximum indentation load.

Maximum indentation load: 20 μN
Tip diameter: 100 nm

The range of a single measurement was set at 10 square micrometers, and the storage elastic modulus E' and loss tangent tan δ values were made into mapping images of that size and with color separation from white to pink to red to reddish-purple to blue to indigo. Then, the difference in color in the images was determined using a scanner or a digital microscope. Finally, the portion that fell in the targeted range of storage elastic modulus E' and the portion that fell in the targeted range of loss tangent tan δ were each extracted. The extracted images were superposed, overlapping portions were further extracted, and the area was measured. This operation was performed over a 5000 μm$^2$ cross section of the sliding member.

Meanwhile, the values for storage elastic modulus E' and loss tangent tan δ were used to determine the structure corresponding to the polymer A group and the polymer B group. In these Examples, manufacturing method [b] was used, so the values for storage elastic modulus E' and loss tangent tan δ were similarly mapped for the products of kneading steps 1 and 2. The products of these steps are not as compositionally complex as the sliding member, and have a known composition and compositional amount, so the storage elastic modulus E' and loss tangent tan δ for the structures of each can be ascertained as absolute values. The storage elastic modulus E' and loss tangent tan δ for each structure are substantially constant values, but are observed as a range. This specific range value can be used to determine the corresponding component.

The storage elastic modulus E', including the polymer B group in the Examples, was such that PP≧crosslinked UHMW-PE>crosslinked SBS≅crosslinked HDPE>crosslinked EPDM, and the loss tangent tan δ was such that PP>crosslinked HDPE>crosslinked EPDM≅crosslinked SBS≧crosslinked UHMW-PE. For example, in Examples 1, 3, and 4, the ranges are as shown in Table 3, and the structure can be determined.

TABLE 3

| | Component | Dynamic modulus mode | | Domain type |
| --- | --- | --- | --- | --- |
| | | Storage elastic modulus E' (GPa) | loss tangent tan δ | |
| Polymer A group | crosslinked UHMW-PE | 9.5-11.5 | 0.19-0.27 | domain 2 |
| | Crosslinked HDPE | 7.0-8.5 | 0.30-0.38 | domain 1 |
| | Crosslinked SBS | 7.0-8.3 | 0.23-0.28 | domain 1 |
| | Crosslinked EPDM | 3.5-6.8 | 0.20-0.37 | domain 1 |
| Polymer B group | PP | 8.5-16 | 0.42-0.65 | — |

To find the area of domain 1, the area was measured for the portion of the sliding member cross section where the storage elastic modulus E' at 23° C. was at least 3 GPa and less than 9 GPa, and the loss tangent tan δ was from 0.1 to 0.4. To find the area of domain 2, the area was measured for the portion of the sliding member cross section where the storage elastic modulus E' at 23° C. was at least 9 GPa and no more than 13 GPa, and the loss tangent tan δ was from 0.1 to 0.3. The areas of domains 1 and 2 were added together to find the area of the polymer A group. The proportion of the polymer A group was found from the area of the polymer A group and the measured area. The domain ratio was found from the areas of domains 1 and 2. To find the area of the polymer B group, the area was measured for the portion of the sliding member cross section where the storage elastic modulus E' at 23° C. was from 5 to 17 GPa, and the loss tangent tan δ was from greater than 0.4 and no more than 0.7. These results are given in Table 2.

Figure 5:
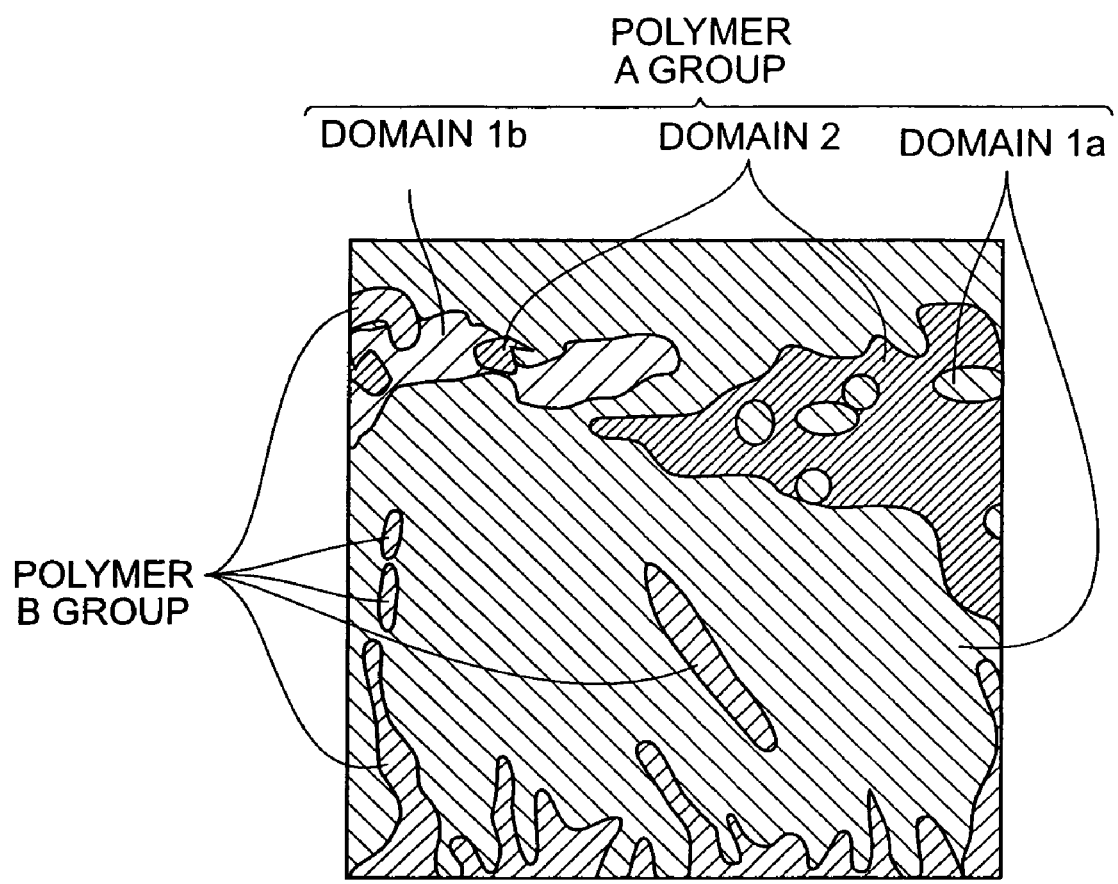
FIG. 5 is a model diagram of the morphology of the weatherstrip composition of Example 1.

Since the structure can be distinguished by storage elastic modulus E' and loss tangent tan δ, the morphology of sliding member can be clarified. FIG. 5 is a model diagram of the morphology of the weatherstrip composition of Example 1, which was created based on the analysis of storage elastic modulus E' and loss tangent tan δ in Example 1. By performing analysis of modulus E' and loss tangent tan δ in detail, it was found that domain 1 was composed of domain 1a and domain 1b in FIG. 5. Domain 1a is mostly composed of crosslinked SBS and includes crosslinked HDPE partially. Domain 1b is mostly composed of crosslinked HDPE. Domain 2 mainly has contact with domain 1a, and a part of domain 2 is surrounded by, or has contact with domain 1b which is dispersed in domain 1a. Domain 1a is dispersed in domain 2 which is dispersed in domain 1a. Domain 1a, domain 1b and domain 2 make up polymer A group. The phase comprising polymer B group is composed of PP and has contact with domain 1a and domain 1b. Moreover, a part of the phase comprising polymer B is dispersed in domain 1a.

Figure 6:
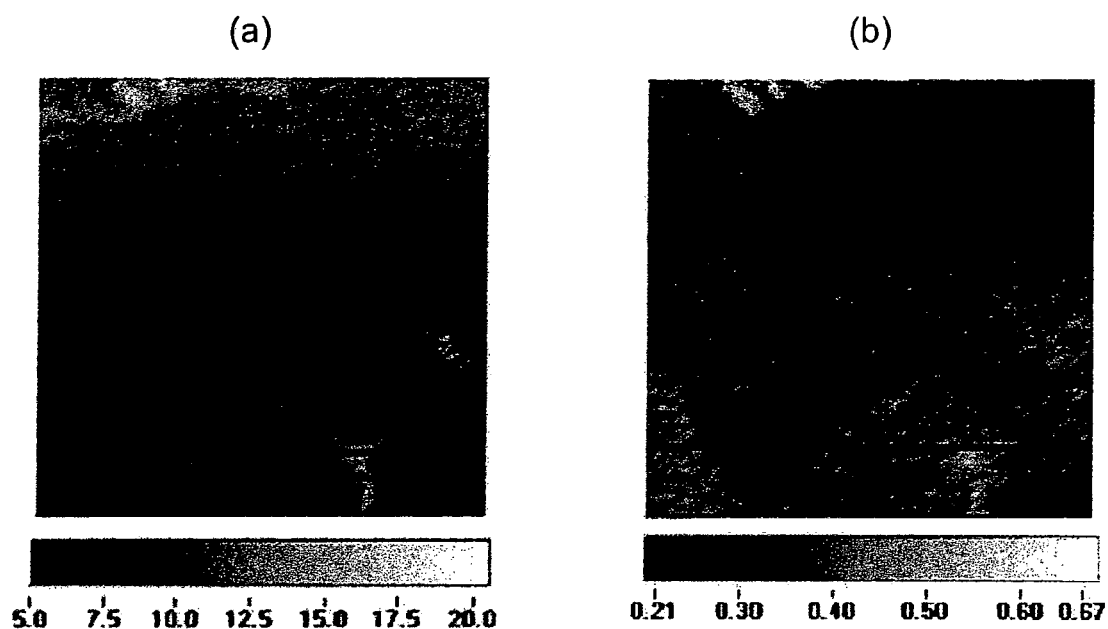
FIG. 6a is a mapping image obtained by measuring the storage elastic modulus E' of a part of the weatherstrip composition of Example 1 containing domain 1c with a super-light load thin-film hardness tester.
FIG. 6b is a mapping image obtained by measuring the loss tangent tan δ of the part of the weatherstrip composition of Example 1 containing domain 1c with a super-light load thin-film hardness tester.
Figure 7:
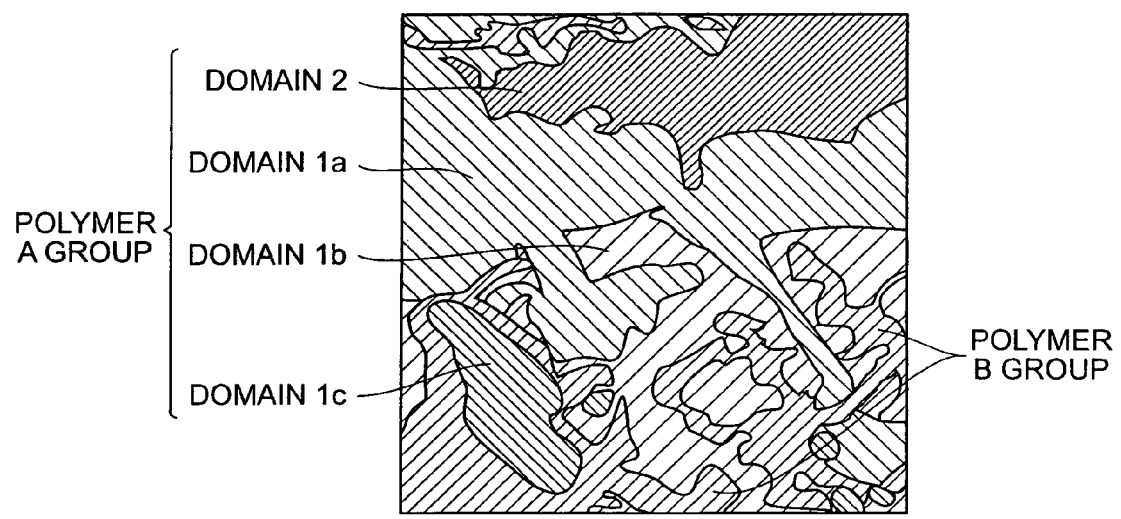
FIG. 7 is a diagram of the morphology of the part containing domain 1c in Example 1.

Further, domain 1 has domain 1c in addition to domain 1a and domain 1b. Domain 1c is composed of crosslinked EPDM. FIG. 6a is a mapping image obtained by measuring the storage elastic modulus E' of a part of the weatherstrip composition of Example 1 containing domain 1c with a super-light load thin-film hardness tester. FIG. 6b is a mapping image obtained by measuring the loss tangent tan δ of the part of the weatherstrip composition of Example 1 containing domain 1c with a super-light load thin-film hardness tester. FIG. 7 is a diagram of the morphology of the part containing domain 1c in Example 1, which was created based on the analysis of storage elastic modulus E' and loss tangent tan δ. Domain 1c is surrounded by, or has contact with the phase comprising polymer B group, domain 1a or domain 1b. In the case of Example 1, it is not likely that domain 1c has contact with domain 2. This is connected to the method for producing the weatherstrip composition of Example 1. Specifically, the dynamics crosslinking of the component(s) composing domain 1a, domain 1b and domain 2 was conducted in kneading step 1, thus forming the morphology surrounding domain 2. Moreover, the dynamic crosslinking of the component composing domain 1c was conducted in kneading step 2. Therefore, even if kneading step 3 were to be conducted in such a state that the fluidity of domain 1c was already lowered, the domain 1c would not tend to approach domain 2.

In FIG. 7, among the phase comprising polymer B, domain 2, domain 1a and domain 1b, there is shown the morphology where domain 2 particularly has contact with domain 1a, domain 1a has contact with domain 1b, and the phase comprising polymer B has contact with domain 1a and domain 1b. As is apparent from FIGS. 5 and 7, the weatherstrip composition of Example 1 displays the morphology of a sandwich structure interposed by domain 1 where domain 2 has contact with domain 1a or domain 1b, and the phase comprising polymer B has contact with domain 1a or domain 1b.

(2) Repeated Frictional Contact Test

The weatherstrips from Examples 1 to 4 and Comparative Examples 1 to 3 (which each had a width of 300 mm) were each fixed in a jig. A plate glass, having a width of 100 mm and a thickness of 4 mm, is in sliding contact with the lip on one side of the weatherstrip under conditions where the load on the lip is 10 N. A repeated frictional contact test was conducted using a motor that moves the plate glass horizontally at an average speed of 150 mm/second. The area of the sliding member of the lip in contact with the plate glass was set at approximately 0.5 cm$^2$. The plate glass and the sliding member of the lip were put in linear contact. Although the contact width increased slightly as the number of slide repetitions increased, wear marks rarely exceeded 5 mm. In the repeated frictional contact test, first muddy water was applied to the lip of the weatherstrip and the plate glass was reciprocated 50 times, then the lip was wiped with a cloth, then water was applied and the plate glass was reciprocate 50 times, and then the lip was wiped with a cloth. Afterwards, the plate glass was reciprocated 200 times in a dry state, then water was applied to the lip and the plate glass was reciprocated 50 times. One cycle comprised a total of 350 reciprocal movements, and the test was continued for 20 cycles.

The slidability, wear resistance, squeaking noise, deformation of 60 deg. bend, rubbing sound, and surface roughness (R$^a$) were evaluated as follows, the results of which are given in Table 2.

Slidabilty was rated excellent if the maximum sliding resistance at 20 cycles was 12 N or less, good if over 12 N and no more than 15 N, fair if over 15 N and no more than 20 N, and poor if over 20 N.

To evaluated wear resistance, the initial thickness was measured. The thickness of the sliding member of the lip after the above-mentioned 20 cycles of reciprocal movement was measured under a microscope. The rating was excellent if the difference between the initial thickness and the thickness after the 20 cycles was no more than 30 μm, good if over 30 μm and no more than 60 μm, fair if over 60 μm and no more than 95 μm, and poor if over 95 μm.

The rating for squeaking noise was excellent if there was no squeaking noise during the 20 cycles of reciprocal movement, fair if there was one occurrence of squeaking noise in just one of the 20 cycles, and poor if there was more than one occurrence of squeaking noise in just one of the 20 cycles.

The rating for deformation of 60 deg. bend was excellent if the lip was opened to 60° and then immediately recovered to its original state, fair if it took one day for this recovery, and poor if there deformation remained even after one day.

For rubbing sound, the plate glass was reciprocated 50 times in an initial state in which the lip was dry, prior to the application of the muddy water, and the rating was excellent if no noise was generated during this time, fair if a faint rasping sound could be heard, and poor if a distinct rasping sound could be heard.

The surface roughness (Ra) was evaluated according to JIS B 0601-1994, using a surface roughness meter SURFCOM 408A (trade name of Mimasu Semiconductor). Three different locations were measured on the sliding member surface of a coextrusion molded weatherstrip, and the average value (μm) was found.

As is clear from Table 2, the weatherstrip of the present invention exhibited good results in evaluations of its slidability, wear resistance, squeaking noise, deformation of 60 deg. bend, and rubbing sound.

Also, the area ratios of the polymer A group and polymer B group found from the mapping of the storage elastic modulus E' and loss tangent tan δ of the sliding member cross section were in fairly good agreement with the weight percentages of the components that made up the structures thereof.

The weatherstrip of the present invention has excellent sliding properties and wear resistance, generates less squeaking noise and rubbing sound, and has less permanent set and whitening during its installation in a window frame.

The present invention can provide a weatherstrip which has excellent sliding properties and wear resistance, generates less squeaking noise and rubbing sound, and has less permanent set and whitening during its installation in a window frame.

What is claimed is:

1. A weatherstrip composition comprising the following polymer A group and polymer B group, Polymer A group: A polymer group made up of a domain 1 consisting of crosslinked product of a polymer selected from a group consisting of ethylene polymer, ethylene/α-olefin copolymer (where the α-olefin has from 3 to 20 carbons), ethylene/α-olefin/diene copolymer (where the α-olefin has from 3 to 20 carbons), homopolymer rubber of a conjugated diene monomer, copolymer polymerized with a conjugated diene monomer and an aromatic vinyl monomer, and hydrogenated copolymer polymerized with a conjugated diene monomer and an aromatic vinyl monomer (where the hydrogenation of all double bonds except for the aromatic groups is at least 50%), and a domain 2 consisting of crosslinked product of a polymer having a number average molecular weight of from 500,000 to 7,000,000 selected from ethylene polymer and ethylene/α-olefin copolymer (where the α-olefin has from 3 to 20 carbons), wherein the storage elastic modulus E of domain 1 under conditions of a frequency of 200 Hz and a temperature of 23° C. is at least 3 GPa and less than 9 GPa, and the loss tangent tan δ is from 0.1 to 0.4, the storage elastic modulus E' of domain 2 under the same conditions is at least 9 GPa and no more than 13 GPa, and the loss tangent tan δ is from 0.1 to 0.3, and the ratio of domain 1 and domain 2 in the polymer A group (domain 1:domain 2) is from 50:50 to 95:5 (wt %) (the amount in which polymer A group is contained is from 40 to 100 wt % based on the total weight of the weatherstrip composition), Polymer B group: A polymer group made up of at least one thermoplastic resin selected from propylene polymer, ethylene/propylene copolymer, and ethylene/propylene/α-olefin terpolymer (where the α-olefin has from 3 to 20 carbons), wherein the storage elastic modulus E' measured under the same conditions is from 5 to 17 GPa, and the loss tangent tan δ is greater than 0.4 and no more than 0.7 (the amount in which polymer B group is contained is from 0 to 40 wt % based on the total weight of the weatherstrip composition), wherein domain 2 exists in contact with domain 1.

2. The weatherstrip composition according to claim 1, wherein domain 1 is interposed between domain 2 and the phase comprising polymer B.

3. The weatherstrip composition according to claim 1, further containing 5 to 20 wt % of silicone compound.

4. The weatherstrip composition according to claim 2, further containing 5 to 20 wt % of silicone compound.

5. A sliding member which is for a weatherstrip and covers the sliding part of a lip in sliding contact with window glass, wherein said sliding member is composed of the weatherstrip composition according to claim 1.

6. A sliding member which is for a weatherstrip and covers the sliding part of a lip in sliding contact with window glass, wherein said sliding member is composed of the weatherstrip composition according to claim 2.

7. A sliding member which is for a weatherstrip and covers the sliding part of a lip in sliding contact with window glass, wherein said sliding member is composed of the weatherstrip composition according to claim 3.

8. A sliding member which is for a weatherstrip and covers the sliding part of a lip in sliding contact with window glass, wherein said sliding member is composed of the weatherstrip composition according to claim 4.

9. A weatherstrip in which the sliding part of a lip in sliding contact with window glass is covered by a sliding member, wherein the sliding member is composed of the weatherstrip composition according to claim 1.

10. A weatherstrip in which the sliding part of a lip in sliding contact with window glass is covered by a sliding member, wherein the sliding member is composed of the weatherstrip composition according to claim 2.

11. A weatherstrip in which the sliding part of a lip in sliding contact with window glass is covered by a sliding member, wherein the sliding member is composed of the weatherstrip composition according to claim 3.

12. A weatherstrip in which the sliding part of a lip in sliding contact with window glass is covered by a sliding member, wherein the sliding member is composed of the weatherstrip composition according to claim 4.

* * * * *